(12) United States Patent
Watanabe et al.

(10) Patent No.: US 9,837,075 B2
(45) Date of Patent: Dec. 5, 2017

(54) STATISTICAL VOICE DIALOG SYSTEM AND METHOD

(71) Applicant: Mitsubishi Electric Research Laboratories, Inc., Cambridge, MA (US)

(72) Inventors: Shinji Watanabe, Arlington, MA (US); John R. Hershey, Winchester, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 84 days.

(21) Appl. No.: 14/176,457

(22) Filed: Feb. 10, 2014

(65) Prior Publication Data
US 2015/0228275 A1 Aug. 13, 2015

(51) Int. Cl.
G10L 15/14 (2006.01)
G10L 15/18 (2013.01)
G10L 15/22 (2006.01)
G10L 15/08 (2006.01)

(52) U.S. Cl.
CPC ........ *G10L 15/142* (2013.01); *G10L 15/1822* (2013.01); *G10L 15/22* (2013.01); *G10L 15/083* (2013.01)

(58) Field of Classification Search
None
See application file for complete search history.

(56) References Cited

U.S. PATENT DOCUMENTS

| 2002/0198714 | A1  | 12/2002 | Zhou |
| 2010/0312561 | A1  | 12/2010 | Di Profio et al. |
| 2012/0035935 | A1* | 2/2012  | Park ........................ G10L 15/22 704/275 |
| 2012/0053945 | A1* | 3/2012  | Gupta ..................... G10L 15/22 704/256 |
| 2012/0173244 | A1  | 7/2012  | Kwak et al. |
| 2012/0290509 | A1  | 11/2012 | Heck et al. |
| 2014/0074477 | A1* | 3/2014  | Bangalore .............. G10L 15/02 704/257 |

FOREIGN PATENT DOCUMENTS

WO 2006084228 A1 8/2006

OTHER PUBLICATIONS

Steve Young, Malica Gasic, Blaise Thomson, Jason D Williams, "POMDP-Based Statistical Spoken Dialog Systems: A Review," , Jan. 2012, vol. X, IEEE, pp. 1-18, URL :http://research.microsoft.com/pubs/185321/young2013procieee.pdf.*

(Continued)

*Primary Examiner* — Richa Mishra
(74) *Attorney, Agent, or Firm* — Gene Vinokur; James McAleenan; Hironori Tsukamoto

(57) ABSTRACT

A method for processing a voice command using a statistical dialog model determines a belief state as a probability distribution over states organized in a hierarchy with a parent-child relationship of nodes representing the states. The belief state includes the hierarchy of state variables defining probabilities of each state to correspond to the voice command and a probability of a state of a child node in the hierarchy is conditioned on a probability of a state of a corresponding parent node. A system action is selected based on the belief state.

8 Claims, 7 Drawing Sheets

(56) References Cited

OTHER PUBLICATIONS

Steve Young, Malica Gasic, Blaise Thomson, Jason D Williams, "POMDP-Based Statistical Spoken Dialog Systems: A Review,", Jan. 2012, vol. X, IEEE, pp. 1-18, URL :http://research.microsoft.com/pubs/185321/young2013procieee.pdf.*
Theocharous et al. "Learning Hierarchical Partially Observable Markov Decision Process Models for Robot Navigation." Proceedings of the 2001 IEEE International Conference on Robotics and Automation. Seoul, Korea. May 21-26, 2001.
Yoshino et al. "Statistical Dialogue Management using Intention Dependency Graph," International Joint Conference on Natural Language Processing, Oct. 1, 2013. pp. 962-966.
Young. "Using POMDPS for Dialog Management," Spoken Language Technology Workshop, 2006. IEEE. Dec. 10, 2006. pp. 8-13.
Young et al. "POMDP-Based Statistical Spoken Dialog Systems: A Review," Proceedings of the IEEE. vol. 101, No. 5, May 1, 2013.

\* cited by examiner

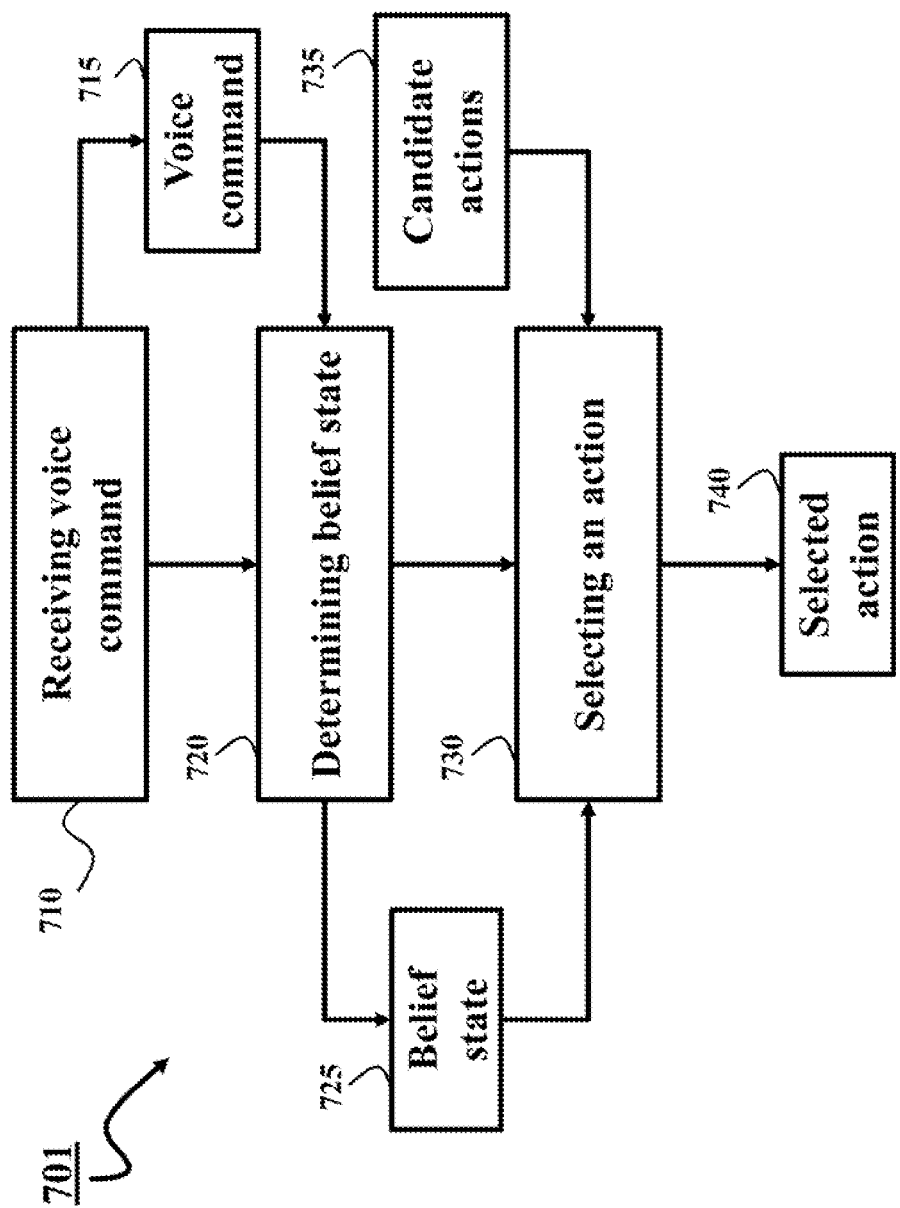

STATISTICAL VOICE DIALOG SYSTEM AND METHOD

FIELD OF THE INVENTION

This invention generally relates to voice dialog systems for human-computer interaction, and more specifically to statistical dialog models for voice dialog systems.

BACKGROUND OF THE INVENTION

Voice dialog systems are widely used in various applications, such as in-vehicle communication, travel reservation and inquiry system. A basic goal of the voice dialog systems is to understand intentions of a user from the speech, and to execute commands based on the intentions.

The voice dialog systems can be rule-based or statistical. The rule based dialog system operates based on a single hypothesis regarding the current state of the dialog, which represents what the system so far has determined from the user's speech about the user's intentions, and contains pre-defined system actions for each dialog state, such as prompting the user for more information or carrying out the user's request. Speech recognition and natural language understanding are used to determine the transition from one dialog state to another, following the action. This transition is governed by deterministic rules, which allow transitions only to a pre-defined set of states.

In a statistical dialog model, the system uses a probabilistic model to represent its knowledge of the user's possible intentions. The system thus considers multiple hypotheses of the user's intention and the corresponding results of voice command recognition. The optimum system response is determined based on probabilities of the hypothesis, and the recognition result can be a subject to a confirmation process such that the intention of a command can be better determined or confirmed.

Dialogs speech often exhibit ambiguities. In addition, the semantic meaning or the intent of the speech often cannot be inferred even when the literal meaning is understood. In the language based systems, such ambiguities can cause degradation of the system performance. For instance, the intent of the sentence "lower the volume" in a home entertainment environment can be ambiguous even though the literal meaning of the spoken words can be well understood. In this particular example, the ambiguity can be due to the fact that there are several appliances in the same household whose volume can be controlled but the spoken sentence does not explicitly indicate, which appliance's volume is to be lowered.

In a voice-based application, different semantic meanings of a dialog can be mapped to different actions. Misunderstanding the semantic meaning or the intent of a command often leads to errors that decrease system performance and causes user's frustration and dissatisfaction.

Solutions to this problem include increasing a number of states in the statistical model or providing more sophisticated error handling model. See, e.g., U.S. 2012/0173244. However, the increase of the number of the states can negatively effect the performance of the voice dialog system with statistical dialog model.

SUMMARY OF THE INVENTION

One of the objectives in a voice dialog system using statistical dialog models is to disambiguate belief states of possible intentions of a user while reducing a number of questions for the user. The system disambiguates the belief states by selecting a system action, which can be in the form of a number of alternatives presented to the user for selection. However, if the statistical dialog models have a flat structure of states, then the ambiguity is resolved directly among possible intentions of the user, which given the large size of modern statistical dialog models, can be a difficult task resulting in a large number of possible questions to the user.

The embodiments of the invention are based on recognizing that the states can be grouped into different categories according to relationships among the states. For example, the states can be grouped into different domains of the speech or actions, and/or grouped into categories associated with different types of actions within the domains. Such grouping can allow disambiguating the user intention, not only among the possible intentions themselves, but also on different levels of different categories and/or domains.

The embodiments of the invention organize the states in a statistical dialog model of a voice dialog system into a hierarchical structure with a parent-child relationship of nodes representing the states. Leaf nodes can correspond to the states representing the specific intention of the user that the system is aiming to determine and execute. The intermediate nodes can represent intention properties or categories of its descendent nodes.

Due to the hierarchical relationship of the states, in some embodiments, the belief state is a probability distribution over the hierarchy of states represented as a product of conditional probabilities of each child node given its parent nodes.

The embodiments of the invention define a set of candidate system actions for the system to consider, based in part upon this probability distribution defined on the hierarchical representation of the states. Some of the candidate system actions are defined according to the conditional probabilities of intermediate nodes in the hierarchy. In some embodiments of the invention, the system actions present the user with choices corresponding to states of a subset of the child nodes for which the conditional probabilities are largest. For example, the system actions for disambiguating the user intentions are selected from the candidate system actions by optimizing a cost function based on the belief state.

In some embodiments, the candidate system actions include the N-best scoring child nodes for each level in the hierarchy. Such selection ensures that all levels in the hierarchal structure are represented in the understanding of user intention. In some embodiments, the number N varies among different levels.

Accordingly, one embodiment discloses a method for processing a voice command using a statistical dialog model. The method includes determining, in response to receiving the voice command, a belief state as a probability distribution over states organized in a hierarchy with a parent-child relationship of nodes representing the states, such that the belief state includes the hierarchy of state variables defining probabilities of each state to correspond to the voice command, wherein a probability of a state of a child node in the hierarchy is conditioned on a probability of a state of a corresponding parent node; and selecting a system action based on the belief state. The steps of the method are performed by a processor.

Another embodiment discloses a statistical voice dialog system for processing a voice command. The system includes a storage unit for storing a hierarchy of states with a parent-child relationship of nodes representing the states, such that a probability of a state of a child node to correspond to the voice command is conditioned on a probability of a state of a parent node to correspond to the voice command; an update unit for updating a probability distribution over the states using a product of conditional probabilities of each child node given its parent nodes to produce a belief state including the hierarchy of state variables defining probabilities of each state to correspond to the voice command; and a command unit for selecting a system action based on the belief state.

Yet another embodiment discloses a method for processing a voice command using a statistical dialog model. The method includes determining, in response to receiving the voice command, a belief state as a probability distribution over states organized in a hierarchy with a parent-child relationship of nodes representing the states, such that the belief state includes the hierarchy of state variables defining probabilities of each state to correspond to the voice command, wherein a probability of a state of a child node in the hierarchy is conditioned on a probability of a state of a corresponding parent node, and wherein the states of the hierarchy are states of Partially Observable Markov Decision Process (POMDP); selecting a subset of states from multiple levels of the hierarchy with highest value of state variables; selecting a set of candidate actions corresponding to the subset of states; and selecting the system action from the set of candidate actions by solving the POMDP.

BRIEF DESCRIPTION THE DRAWINGS

FIG. 7 is a block diagram of a method for determining a voice command using a statistical dialog model employing the hierarchical structure of the states.

DETAILED DESCRIPTION OF PREFERRED EMBODIMENTS

Figure 1:
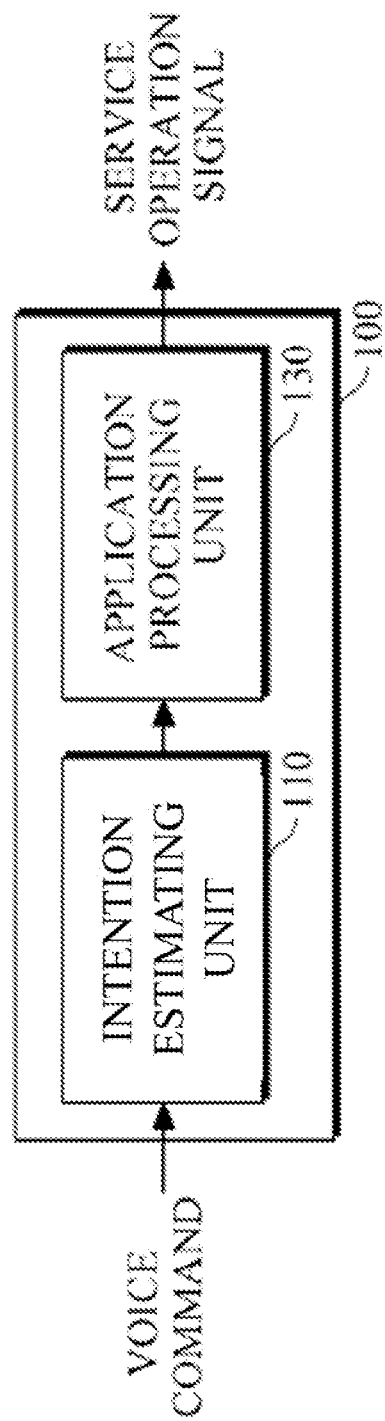
FIG. 1 is a block diagram illustrating an example of a system for voice command recognition according to some embodiments of the invention.

FIG. 1 shows an example of a system 100 for voice command recognition. The system can be stand-alone or can be included in a terminal, for example, a computer, in a dashboard of a vehicle, a mobile terminal, a smart phone, a camera, an MP3 player, a tablet, a home appliance, and the like. The system 100 includes a computer-based statistical voice dialog system that can be implemented using one or more processors. The system 100 includes an intention estimating unit 110 and an application processing unit 130. The intention estimating unit 110 can generate a command intention that corresponds to a voice command of a user. The command intention can be based on a probability distribution that corresponds to various situations that are expected based on a current state of a dialog. The intention estimating unit 110 can generate a command to prompt the user for a clarification, or can determine a final command intention of the voice command. The unit 110 can also optionally correct an error in recognizing a voice command using the command intention probability distribution. For example, the intention estimating unit 110 can use a statistical dialog model. For example, the statistical dialog model can be obtained through a Partially Observable Markov Decision Process (POMDP).

In one embodiment, the intention estimating unit 110 infers the user intentions based on probabilities. This probability distribution over states is called the belief state distribution b(s), wherein s is a belief state. After, the unit 110 determines the belief state distribution, the unit 110 selects the most appropriate command, e.g., the unit selects an action a by minimizing a cost function considering the belief state distribution.

The application processing unit 130 can execute a command generated by the command intention estimating unit 110. Typically, there are two types of commands or system actions. One type is a prompt command to confirm or clarify the user intentions. The application processing unit 130 can use speech synthesizer to output the prompt to a user. The other type of action is a control command that executes the requested action and terminates the dialog. The application processing unit 130 can process the final intention command by selecting and interacting with external systems and applications.

Figure 2:
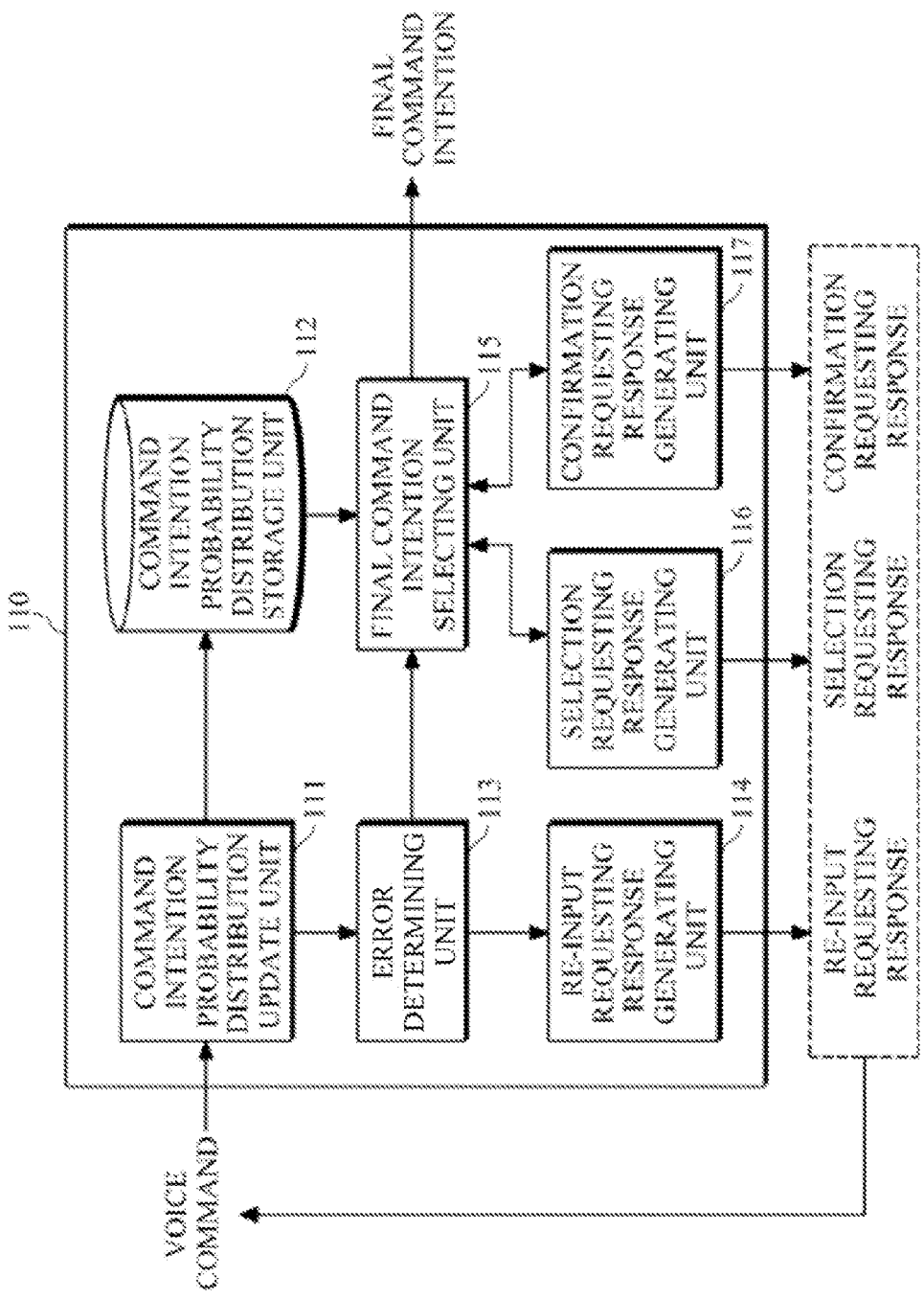
FIG. 2 is a diagram illustrating an example of a command intention estimating unit of the system of FIG. 1 according to some embodiments of the invention.

FIG. 2 shows a block diagram of an exemplar intention estimating unit of the system of FIG. 1. The intention estimating unit 110 includes one or a combination of an update unit 111 for updating a command intention probability distribution, a storage unit 112 for storing the command intention probability distribution, an error unit 113 for determining an error, a re-input unit 114 for generating a request for response, a command unit 115 selecting a final command intention, a selection unit 116 for generating a request for the selection, and a confirmation unit 117 for generating a request for a conformation. The update unit 111 can update the probability distribution corresponding to a voice command. For example, the update unit 111 can probabilistically update the accuracy in the recognition of the voice command of the user while a user is speaking. The update unit 111 can store the updated probability distribution, e.g., a belief state, in the storage unit 112.

The storage unit 112 stores a plurality of states organized in a hierarchical structure with a parent-child relationship of nodes representing the states. The hierarchical structure is designed according to the objectives of the voice dialog system.

Figure 3:
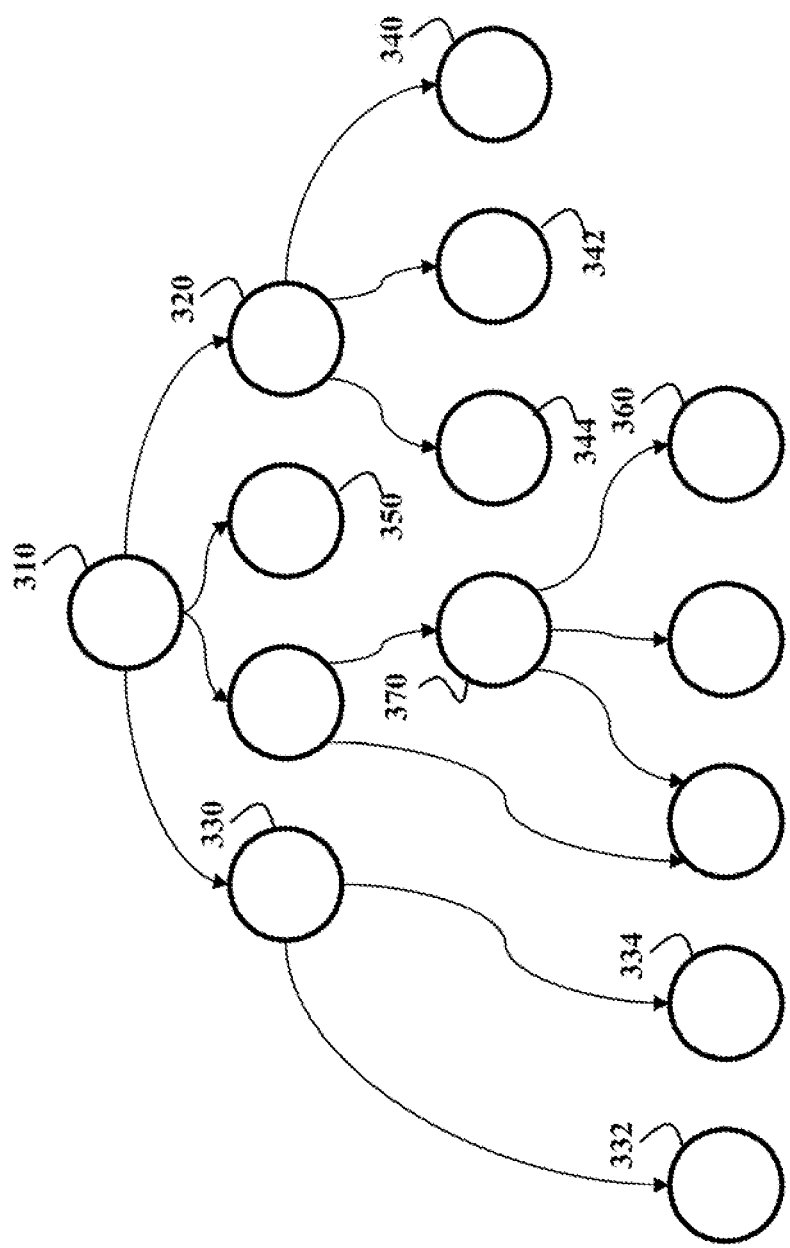
FIG. 3 is an example of a hierarchical structure of states according to some embodiments of the invention.

FIG. 3 shows an example of the hierarchical state structure stored in the storage unit 112. In this representation, a path from the root node 310 to one of its descendent nodes represents a state. In some embodiments, the hierarchy is a multi-level hierarchical structure including a tree or an acyclic graph, lithe hierarchy is a tree, then there is a unique path from the root to any leaf node, so the final state can be identified by the leaf node. In some embodiments, the path can terminate in an intermediate node, e.g., a node 370 indicating a partially specified intention.

In other embodiments, the path always terminate in a leaf node, e.g., nodes 332, 334, and 360, representing a full intention, and the embodiment that allows partial paths can always be converted without loss of generality to an equivalent embodiment that only allows full paths, by adding a leaf node indicating a partial intention for each intermediate node.

The hierarchical nature of the probability distribution over states allows the system to infer the part of the intention that is certain even when there is uncertainty in other parts. For example, if a node 320 represents a particular intention category, such as music, then the nodes 340, 342, and 344 represent more specific actions within that category, such as play, stop, or rewind a song. In such a manner, the system is able to infer that intentions involving the node 320 have a higher probability, even when the system is uncertain about specific actions of the nodes 340, 342, or 344.

The a priori state transition probabilities can also be defined using the hierarchy. For example, the transition from a state terminating at the node 320 to a state that terminates in one of its child nodes 340, 342, or 344 can be considered a priori more probable than a transition to an unrelated state, such as one terminating in nodes 350 or 370 that are not the children of the node 320.

At a given turn in the dialog, the system updates the inferred probability distribution over states based on the previous probability distribution, the previously performed system action, the a priori state transition probabilities, and the probabilities inferred from the voice command. Then the next system action is selected based on these updated probabilities in order to optimize an objective function. In some embodiments, the objective function is constructed to result in higher value when the selected action is likely to result, in a successful dialog completion, with the least user effort, according to the current state probabilities.

The hierarchical structure of the states allow to associate different types of action with different types of nodes. For example, one embodiment associates control actions, i.e., a final intention command, only with states terminating in the leaf nodes, and associates prompt actions, i.e., a prompt command, with the states terminating the intermediate nodes. Such association allows the system to ask more focused questions when the final control command is not clear.

Another embodiment considers all states to be full paths from the root node to the leaf nodes, but performs command actions only when the full path to the leaf node is certain. When there is an uncertainty, the embodiment selects actions, such as prompting for disambiguation at a particular level in the hierarchy, associated with the level in the hierarchy at which uncertainty is most pronounced. This is done by selecting the action that results in the improvement of an Objective function based on considering the consequences of hypothetical system and user actions.

For example, the states that terminate in leaf nodes of the hierarchical structure, such as nodes 340, 350, and 360, are associated with intention commands, i.e., control actions. Conversely, states terminating at intermediate nodes of the hierarchical structure, such as nodes 320, 330, and 370, are associated with prompt commands. The command unit 115 can distinguish between types of the states, e.g., leaf-states vs. intermediate-states. The command unit 115 generates a final command when the state probability distribution indicates that a specific state is certain for the full command including the leaf node, and generates a prompt command if the intention is only certain at an intermediate-state.

In one embodiment, the update unit 111 can output the updated command intention probability distribution to the error determining unit 113. The error determining unit 113 can determine an error in recognizing the voice command and/or an error in figuring out the command intention through the updated command intention probability distribution that is updated by the update unit 111. For example, the error determining unit 113 can determine whether the command intention corresponding to the voice command input is accurate. If the error determining unit 113 determines that the voice command input and the estimated command intention are accurate, the updated probability distribution can be outputted to the command unit 115. However, if the error determining unit 113 determines that the voice command input is inaccurate or that the estimated command intention is inaccurate, error information can be output to the re-input requesting response generating unit 114.

For example, if the voice input is corrupted by noise in the environment, the error determining unit 113 may determine this by evaluating speech recognition confidence scores, and send information about the type of error to the re-input unit 114. The re-input unit 114 can generate a response requesting is re-input of the voice command, in response to the error determining unit 113 determining that the voice command contains an error. In response to the user re-inputting the voice command, the error determining unit 113 can determine whether the error is removed through the newly input voice command.

The command unit 115 can select a final command intention in the updated command intention probability distribution, when the error determining unit 113 determines that there is no error. For example, the command unit 115 can select a command intention of a specific state that has a probability that exceeds a threshold value in the updated intention probability distribution. If the specific state is a leaf-state, then the unit 115 outputs a final intention command of the leaf-state to the application processing unit 130.

If the specific state is an intermediate state, or if there is no specific state that has a probability that exceeds a threshold value in the updated intention probability distribution, then the unit 115 evaluates candidate system actions according to an objective function that depends on the updated intention probability distribution, and selects the action that results in the optimal objective value.

For example, in some embodiments, if there are candidates for the final command intention that have close probabilities in the updated command intention probability distribution, a system action that requests selection of one of the candidates may result in the optimal value from the objective function. When this action is selected, the selection requesting response generating unit 116 can then generate a response that requests selection of one of the candidates. A voice command can be input by the user in response to the request generated by the selection unit 116, and the final command intention can be more reliably selected. The confirmation unit 117 can generate a request that requests confirmation of the final command intention in the updated command intention probability distribution. A voice command can be input by the user in response to the request generated in the confirmation unit 117, and the final command is intention can be more reliably selected. Other types of responses may also be generated such as requests to input, a specific value, such as a name or address.

Hierarchical Representation of State Probabilities

One of the main objectives in the statistical voice dialog systems is to disambiguate a belief state of possible intentions of a user using a minimal number of questions by the system. The system disambiguates belief states by selecting a system action, which can be in the form of a number of alternatives presented to the user for selection. The conventional statistical dialog models generally have a flat structure of states. Accordingly, the ambiguity is resolved directly among possible intentions of the user, which can be a difficult task resulting in a large number of possible questions to the user.

The embodiments of the invention are based on recognition that the states can be grouped into different categories according to relationships among the states. For example, the states can be grouped into different domains of the speech or actions, and/or grouped into categories associated with different types of actions within the domains. Such grouping can allow disambiguating the user intention not only among the possible intentions themselves, but also on different levels of different categories and/or domains.

Various embodiments of the invention organize the states in a statistical dialog model of a voice dialog system according to a hierarchical structure having sub-states with a parent-child relationship of the nodes representing the sub-states. In this representation, a path from root to leaf through the sub-states represents a dialog state. In the case of a tree, where there is a unique path between the root node and any leaf node, leaf nodes can be identified with the dialog state representing the specific intention of the user that the system is aiming to determine and execute. The intermediate nodes are sub-states that represent intention properties or categories of their descendent nodes.

The hierarchical structure of the state, according to embodiments of the invention, defines the relationship between state variables at a given time. This can be contrasted with the hierarchical hidden Markov model (HHMM) in which the hierarchy concerns the transitions between states across time. In some embodiments, the belief state is a probability distribution over the hierarchy of sub-states represented as a product of conditional probabilities of each sub-state child node given its sub-state parent nodes. In various embodiments, the hierarchy of state variables includes non-zero probabilities for at least two child nodes having different parents.

Figure 4:
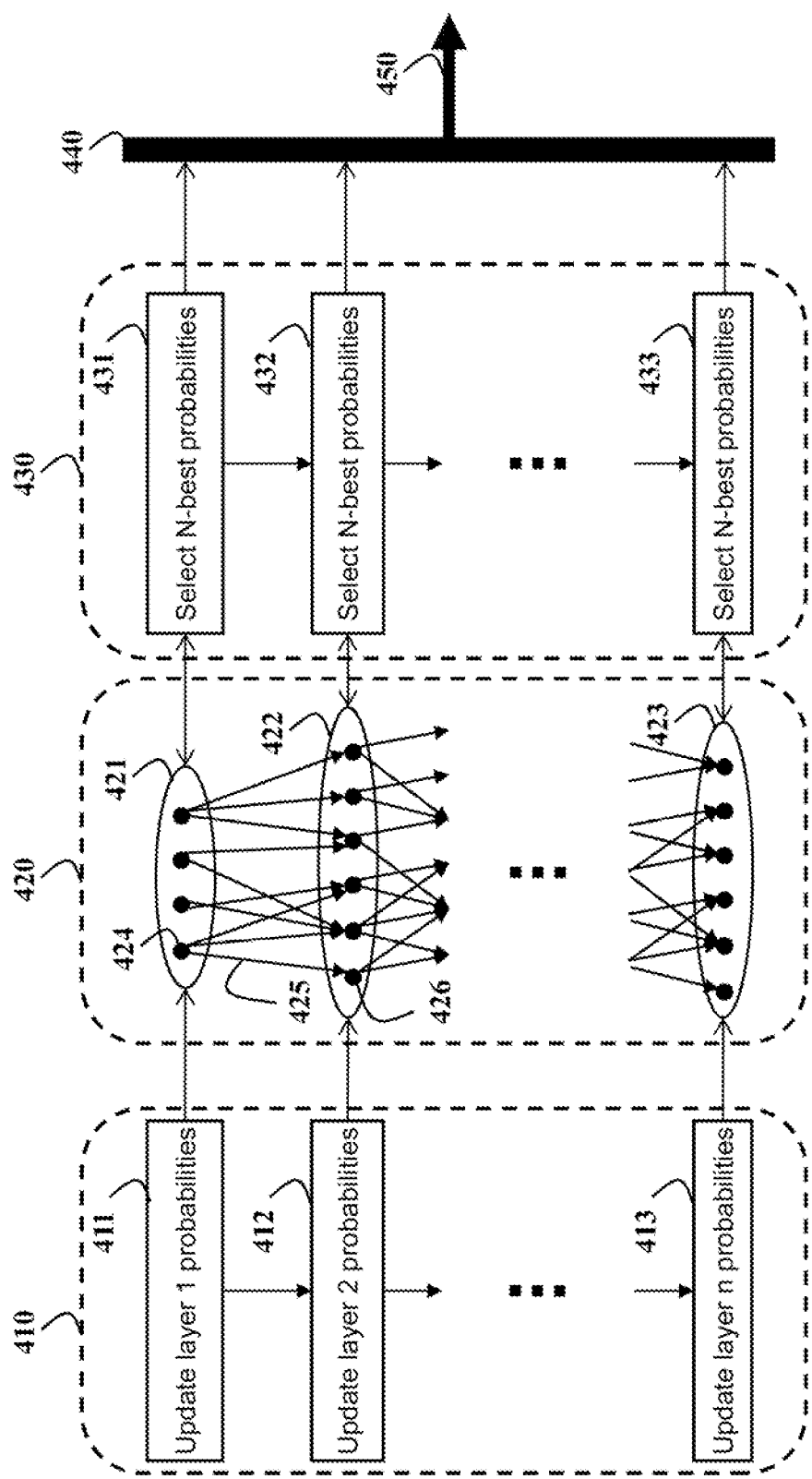
FIG. 4 is a diagram illustrating computation of conditional probabilities in the hierarchically structured belief state according to some embodiments of the invention.

FIG. 4 shows a schematic of a method for determining a voice command using a statistical dialog model according to some embodiments of the invention. The embodiments organize a probability distribution over states in a multi-level hierarchical structure 420 with a parent-child relationship of sub-state nodes representing the distribution over states. For example, the hierarchical structure 420 includes n levels, such as a first level 421, a second level 422 and an n level 423. Each level includes at least one node 424 representing a sub-state in the statistical dialog model. The arrows, such as an arrow 425, indicate the parent-child relationships between the nodes, e.g., the nodes 424 and 426, such that a probability of a sub-state child node is conditioned on its sub-state parent node. The hierarchical structure 420 can be stored, e.g., in the storage unit 112.

Upon receiving a voice input, the embodiments determine 410 the belief state as a hierarchy of state variables defining probabilities of each state to correspond to the user intention. Such determination can be performed by, e.g., the command intention unit 115. In various embodiments, the belief state is a product of conditional probabilities of states associated with each child node given the states of the parent nodes. One embodiment updates the probabilities of the states for each level in a top-down manner, such that probabilities of nodes of a level are determined after the probabilities of nodes of a previous level. This approach allows determining the conditional probability of a state child given its state parent. For example, the embodiment updates 411 first the probabilities of the state of nodes of the first layer, next the embodiment updates 412 the probabilities of the second layer, and subsequently updates 413 the probabilities of the states of the n layer. In alternative embodiments, the probabilities can be updated in other orders.

For example, one embodiment uses a layer index $l \in L$, wherein L is a total number of layers. Usually, the number of layers is greater than three but smaller than the number of belief states S, i.e., that L<S. For simplicity of notation and description, the hierarchy 420 is a tree, and each path from root to leaf node has L levels.

The state is represented as a tuple of state variables, $$s=(s_l)_{l=1:L}=(s_1,s_2,\ldots,s_L),$$

having one element for each level that indicates the state at that level. The probability distribution over state variables is specified in terms of conditional probabilities:

$$p(s)=p(s_1,s_2,\ldots,s_L)=p(s_1)p(s_2|s_1)p(s_3|s_1,s_2)\ldots p(s_L|s_1,s_2,\ldots,s_{L-1}).$$

With conditional independence between levels, the probability is $$p(s)=p(s_1)p(s_2|s_1)p(s_3|s_2)\ldots p(s_L|s_{L-1}).$$

When the hierarchy is a tree, any probability distribution over the states p(s), can be represented using this representation, and the conditional probabilities in the hierarchy can always be determined from the distribution over states by summation:

$$p(s_2|s_1)=\frac{\sum_{s_3,s_4,\ldots,s_L}p(s_1,s_2,\ldots,s_L)}{\sum_{s_2,s_3,\ldots,s_L}p(s_1,s_2,\ldots,s_L)}.$$

For example, the conditional probabilities of an intermediate state, $s_1$ given a state in the level above, $s_1$ represents the probability of a set of all hypothesis that share the state $s_2$, given the state $s_1$ of the level above.

System Actions

For example, there are two difficulties related to the complexity of the statistical voice dialog system. First, there are many possible actions a system can take, so it is important to define a small set of system actions that at the same time is useful. Second, the goal of statistical dialog systems is to infer an optimal system action given the current belief state. Because the belief states can be complex, it is important to have a parsimonious representation of the belief states from which to do this inference. The hierarchical representation of state variables helps in both of these problems.

For example, one of the most common types of system actions is to prompt the users to disambiguate their intention. Such a system action essentially asks the users to indicate which of the elements in a small set of options pertains to their intention. In a large intention hierarchy there may be many hundreds or thousands of such intentions, and the number of sets of these to select from would be very large. However the system can only present the user with questions that can be easily communicated, and the goal is to select the questions that are likely to lead to quick resolution of the uncertainty of the system. Furthermore, typically the system should ask disambiguation questions that pertain to intentions that are likely according to the current estimation of the intention probabilities.

Therefore a useful set of actions can be derived in each level of the hierarchy by considering combinations of likely actions in an "N-best" list of the highest scoring states at a given layer of the hierarchy. The hierarchy is used to define actions according to the current probability distribution over intentions given the previous observations. This satisfies the above requirements by providing a small set of possible actions for the system to consider, such that the actions pertain to disambiguation of states that the user is likely to have, and the actions can be selected to disambiguate at an appropriate layer of generality within the hierarchy to insure that the actions can quickly resolve the uncertainty of the system and can be easily communicated.

Some embodiments select a set of candidate system actions according to different layer of the hierarchy based on probability values of the state variables. For example, some embodiments select 430 N-best scored nodes from each level of the hierarchy. For example, the embodiment selects 431 the N states in the first layer with best probabilities, selects 432 the N states from the second layer, and selects 433 the N states from the n layer. Such selection aims to ensure that all layers in the hierarchal structure are represented in the understanding of user intention. The number N can be constant, or vary among the layers.

The selection 430 allows considering only a small set of candidate actions associated with the selected states in determining 440 the next action 450 of the voice dialog system. The next action can be selected by optimizing an objective function applied to the subset of the state variables selected at the step 430. In one embodiment, the optimization is in accordance with the POMDP. Because the number of state variables and candidate actions to consider is reduced, the consideration of only the candidate actions is likely to reduce the uncertainty in the voice dialog system.

Design Stage

Figure 5:
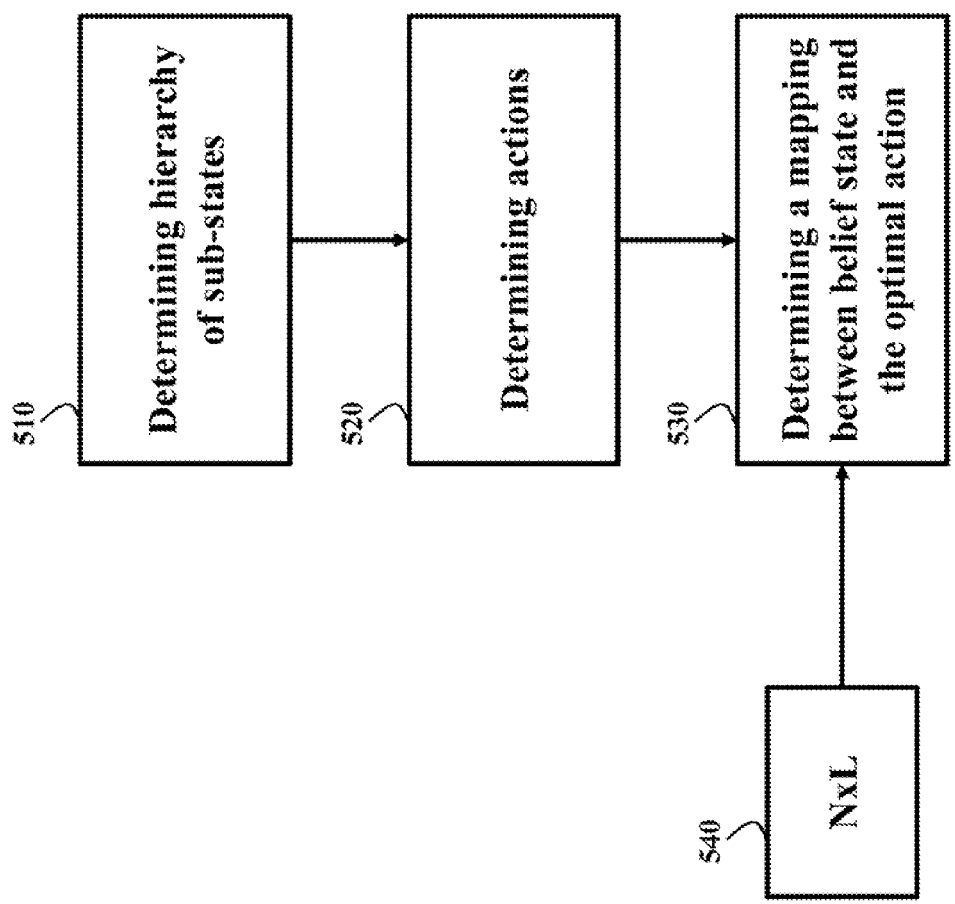
FIG. 5 is a block diagram of a method for designing the statistical dialog model according to some embodiments of the invention.

FIG. 5 shows a block diagram of a method for designing the statistical dialog model according to some embodiments of the invention. For clarity purpose only, the FIGS. 6-7 illustrate a specific non-limiting example of designing the statistical dialog model according to the method of FIG. 5.

During the design stage, the embodiments determine 510 a hierarchy of states including a number of states and a relationship among states. The hierarchy is designed in accordance with the application of the spoken dialog system.

Figure 6:
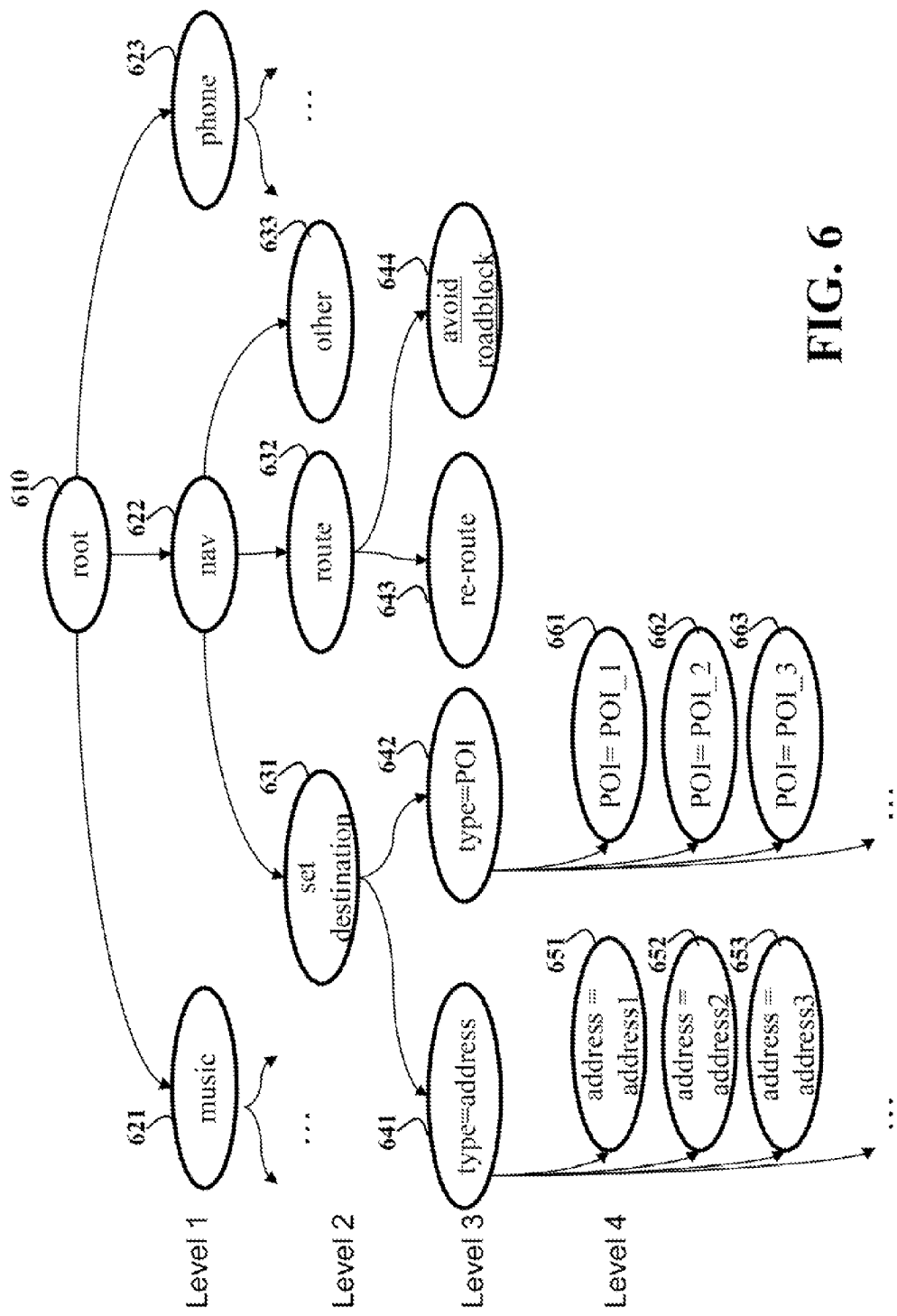
FIG. 6 is a simplified example of a hierarchical organization of sub-states.

FIG. 6 shows a simplified example of such a hierarchy that can be used for a multi-function application that contains music playback, navigation, and telephone inquiry systems. The hierarchy begins with root node 610, which is always present. The child nodes represent the music domain 621, the navigation domain 622 and the telephone domain 623. Each of these nodes has its own sub-hierarchy, but here only a sub-hierarchy for the navigation domain is shown.

Child nodes of the navigation domain 622 are "set destination" 631, routing commands 632, and other 633 command types. Under the routing sub-state 632, there are two leaf nodes, "re-route" 643 and "avoid roadblock" 644. The sub-state "re-route" 643 represents calculating the best new route to the current destination. The sub-state "avoid roadblock" 644 represents calculating a new route to the destination that avoids the current road segment.

Under the "set destination." 631 sub-state there is "type=address" 641 sub-state, which indicates that the destination is set using an address, and "type=POI" 642 sub-state, which indicates that the destination is set using a point of interest. Under "type=address" 641 are leaf states 651, 652, 653, each indicating setting a specific address as the destination. Under "type=POI" 641 are leaf states 661, 662, 663, each indicating setting a specific point of interest as the destination, such as a gas station or a restaurant.

In this example, a state is represented as a path from "root" 610 to a leaf. For example the path "root" 610, "nav" 622, "route" 632, "avoid roadblock" 644 represents the intention to calculate a route that avoids a roadblock. Because the structure is a tree the state can be identified by its leaf node. However other related states share part of the sequence, such as the "re-route" state, which corresponds to the path "root" 610, "nav" 622, "route" 632, "re-route" 643.

Normally there would be a large number of possible leaf states for addresses and points of interest, and the large number of states can be further represented using sub-hierarchies. For example, some embodiments include a hierarchy of categories within with points of interest, dividing the available points of interest into categories and sub-categories such as restaurants, hotels, gas stations, stores of various types, and so-on.

In this example, states ending in a leaf node always represent a user intention that can be fulfilled by pre-defined system action. However, the system does not know the user intention and can only estimate a probability distribution over states. If this distribution is uncertain then the system requests more information from the user using actions corresponding to selection and confirmation responses.

After the states have been defined, one or multiple action types are defined 520, corresponding to reasonable request actions for the system to take when the user intention, is uncertain. The actions correspond to different levels of the tree and can depend upon the probabilities represented in the hierarchy. For example, the system depicted in FIG. 6 can define the following actions, which the system evaluates using its objective function and the current belief state.

Action 1: Request user selection from the two most likely sub-states at level 1 (621, 622, 623) ordered according to their probabilities.

Action 2: Confirm most likely sub-state at level 1 (621, 622, 623), according to their probabilities.

Action 3: Request user selection from the two most likely sub-states at level 2 (631, 632, 633, . . . ) given the most likely substate at level 1 (621, 622, 623), according to their probabilities. For example, if "nav" 622 is more likely than "music" 621, or "phone" 623, then the system prompts the user with the two most likely sub-states from the set "set destination" 631, "route", 632, and "other" 633.

Action 4: Confirm most likely sub-states at level 2 (631, 632, 633, . . . ) given the most likely substate at level 1 (621, 622, 623), according to their probabilities. For example, if according to the belief state, "nav" 622 is more likely than "music" 621, or "phone" 623, then this action would prompt the user to confirm the one most likely sub-state from the set "set destination" 631, "route", 632, and "other", 633.

Such possible actions can be defined at any level, and in general are not associated with specific states. The selection or confirmation items that correspond to the N-best lists are bound to the action at run time.

Next, the embodiments determine 530 a means of mapping between belief state and the optimal action of the spoken dialog system. In some embodiments, the states 510 are states of the POMDP and the determining 530 includes solving the POMDP to determining a mapping from each possible belief state to actions that achieve the best long term sum of rewards. The belief state is a sufficient statistic that summarizes the past history of observations and actions.

For example, one embodiment uses a Bayesian update procedure to calculate the belief state probability distribution over all the product states given a sequence of observations and actions. Unfortunately, the number of belief states is can be infinite and exact solutions to large POMDPs are computationally infeasible. However, many heuristics solutions such as the most likely state heuristic (MLS) and a Q-MDP method can provide satisfactory approximate solutions for the mapping.

Additionally or alternatively, some embodiments determined the mapping only for a subset of the states or state variable. Specifically, some embodiments select a set of N-best list of state for one or several layers L. Thus, only the mapping between a number 540 N×L of combination of states with the optimal action is needed, which reduces the dimensionality of the mapping. In other embodiments, the optimization to determine the action is done during operation, after computing the belief state.

Execution Stage

FIG. 7 shows a block diagram of a method for determining a voice command using a statistical dialog model employing the hierarchical structure of the states. A processor 701 of a spoken dialog system can perform the method of FIG. 7.

Upon receiving 710 a voice command 715, the processor determines 720 the belief state 725 over the hierarchy of states. The voice command originates with an audio signal that is processed using a speech recognition module to produce a set of hypotheses of the recognized speech, along with their probabilities. Pattern-recognition modules can be applied to the recognized speech to produce estimates of the probabilities of various semantic content of the speech, including hypotheses of commands and named entities of interest to the dialog system.

The representations of these hypotheses are used along with the belief state determined from the previous user input, in determining the current belief state. The action 740 of the statistical dialog system is selected 730. In some embodiments this selection 730 done by optimizing an objective function applied to the candidate actions 735. For example, the objective function is to minimize the expected cost of the dialog, where the expectation is taken with respect to the current belief state and the distribution over future dialog states, and the cost is a function of the mismatch between the selected actions and the user's intention as modeled by the dialog state.

The cost function also typically includes a penalty for the length of the dialog such as a fixed cost per dialog interaction. In other embodiments this optimization can be pre-computed to produce a mapping between belief state and system action. In this case, the mapping is used to select the action based on the belief state.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for processing a voice command using a statistical dialog model, comprising:

determining the voice command using a speech recognition of an audio signal;
determining a belief state of the voice command as a probability distribution over states of states variables organized in a hierarchy with a parent-child relationship of nodes representing the states variables, such that the belief state includes the hierarchy of the state variables defining joint probabilities of each state of each state variable to correspond to the voice command, wherein a probability of a state of a child node in the hierarchy is conditioned on a probability of a state of a corresponding parent node, such that an intention of the voice command is represented by the hierarchy of state variables, and wherein the states of the hierarchy of state variables are states of Partially Observable Markov Decision Process (POMDP);

selecting a subset of states from multiple levels of the hierarchy with highest value of state variables;
selecting a set of candidate actions corresponding to the subset of states;
selecting the system action from the set of candidate actions by solving the POMDP; and
executing the system action, wherein steps of the method are performed by a processor.

2. The method of claim 1, wherein the processor is a component of a statistical voice dialog system installed in one or combination of a computer, a dashboard of a vehicle, a mobile terminal, a smart phone, a camera, an MP3 player, a tablet, and a home appliance.

3. The method of claim 1, wherein the belief state is determined as a product of conditional probabilities of each child node given its parent nodes.

4. The method of claim 1, wherein the hierarchy of state variables includes non-zero probabilities for at least two child nodes having different parents.

5. The method of claim 1, wherein the hierarchy is a multi-level hierarchical structure including a directed acyclic graph or a tree.

6. The method of claim 1, further comprising:
selecting N-best-scored child nodes from one or more levels of the hierarchy, wherein the N-best-scored child nodes have highest probabilities among child nodes of their level, wherein N is an integer; and
determining the subset of the state variables according to the probabilities of the N-best scored child nodes.

7. The method of claim 6, wherein N varies among the levels of the hierarchy.

8. A statistical voice dialog system for processing a voice command using a statistical dialog model, comprising a processor configured to determine the voice command using a speech recognition of an audio signal;
determine a belief state of the voice command as a probability distribution over states of states variables organized in a hierarchy with a parent-child relationship of nodes representing the states variables, such that the belief state includes the hierarchy of the state variables defining joint probabilities of each state of each state variable to correspond to the voice command, wherein a probability of a state of a child node in the hierarchy is conditioned on a probability of a state of a corresponding parent node, such that an intention of the voice command is represented by the hierarchy of state variables, and wherein the states of the hierarchy of state variables are states of Partially Observable Markov Decision Process (POMDP);
select a subset of states from multiple levels of the hierarchy with highest value of state variables;
select a set of candidate actions corresponding to the subset of states;
select the system action from the set of candidate actions by solving the POMDP; and
execute the system action.

\* \* \* \* \*